(12) United States Patent
James et al.

(10) Patent No.: US 11,395,491 B2
(45) Date of Patent: Jul. 26, 2022

(54) METHOD FOR IMPROVING TURFGRASS ABIOTIC STRESS TOLERANCE

(71) Applicant: Syngenta Participations AG, Basel (CH)

(72) Inventors: John Robert James, Greensboro, NC (US); Lukas Dant, Greensboro, NC (US)

(73) Assignee: Syngenta Participations AG, Basel (CH)

( * ) Notice: Subject to any disclaimer, the term of this patent is extended or adjusted under 35 U.S.C. 154(b) by 927 days.

(21) Appl. No.: 15/523,850

(22) PCT Filed: Oct. 30, 2015

(86) PCT No.: PCT/US2015/058288
§ 371 (c)(1),
(2) Date: May 2, 2017

(87) PCT Pub. No.: WO2016/073301
PCT Pub. Date: May 12, 2016

(65) Prior Publication Data
US 2018/0303098 A1 Oct. 25, 2018

Related U.S. Application Data

(60) Provisional application No. 62/074,144, filed on Nov. 3, 2014.

(51) Int. Cl.
*A01N 43/82* (2006.01)
*A01N 25/00* (2006.01)

(52) U.S. Cl.
CPC ............ *A01N 43/82* (2013.01); *A01N 25/00* (2013.01)

(58) Field of Classification Search
CPC combination set(s) only.
See application file for complete search history.

(56) References Cited

U.S. PATENT DOCUMENTS

| 9,770,028 B1 | 9/2017 | James |
| 2012/0077677 A1 | 3/2012 | Willms et al. |

FOREIGN PATENT DOCUMENTS

| CN | 102665409 A | 9/2012 |
| CN | 102933078 A | 2/2013 |
| WO | 2009/095098 A2 | 8/2009 |
| WO | 2011063947 A1 | 6/2011 |
| WO | 2011/153442 A1 | 12/2011 |
| WO | 2012/167091 A1 | 12/2012 |

OTHER PUBLICATIONS

International Search Report for International Patent Application PCT/US2015/058288 dated Dec. 14, 2015.
Lee, J., Fry, J., and Tisserat, N., Dollar Spot in Four Bentgrass Cultivars as Affected by Acibenzolar-S-Methyl and Organic Fertilizers, Online, Plant Health Progress, 2003.

*Primary Examiner* — Kathrien A Cruz
(74) *Attorney, Agent, or Firm* — BakerHostetler; Toni-Junell Herbert

(57) ABSTRACT

The present invention relates to a method of controlling abiotic stress on warm-season turfgrass using an effective amount of acibenzolar-s-methyl.

28 Claims, 10 Drawing Sheets

METHOD FOR IMPROVING TURFGRASS ABIOTIC STRESS TOLERANCE

RELATED APPLICATION INFORMATION

This application is a 371 of International Application No. PCT/US2015/058288, filed 30 Oct. 2015, which claims priority to U.S. Application No. 62/074,144, filed 3 Nov. 2014, the contents of which are incorporated herein by reference herein.

FIELD OF TECHNOLOGY

The present invention relates to methods of improving the abiotic stress tolerance of turfgrass. More specifically, the present invention relates to methods of improving the abiotic stress tolerance of warm-season turfgrass with acibenzolar-s-methyl and, optionally, trinexapac-ethyl.

BACKGROUND

There are numerous problems that turfgrass managers face in maintaining turfgrass at a standard of quality expected by users. While the problems are many, those relating to abiotic stress (including drought stress) are particularly challenging to manage and control. For example, abiotic stress can affect turfgrass plants on golf courses causing a loss of revenue from reduced playability. One example of a common problem for golf course managers is abiotic stress caused by drought or heat.

The compound acibenzolar-S-methyl (S-methyl benzo[1,2,3]thiadiazole-7-carbothioate) acts as a functional analogue of the natural signal molecule for systemic activated resistance (SAR), salicylic acid. It activates the host plant's natural defense mechanism. The structure of acibenzolar-S-methyl can be represented as follows:

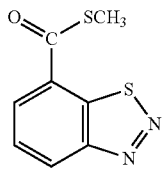 [SMILES: CSC(=O)c1cccc2nnsc12]

Acibenzolar-S-methyl is commercially available under the trade name Actigard® (Syngenta Crop Protection, Inc.).

Plant growth regulators are often used to regulate the growth and development of turfgrasses as well as crops. There are several different classes of plant growth regulators. Known classes include azoles (such as uniconazole, and paclobutrazol), cyclohexane carboxylates (such as trinexapac-ethyl, and prohexadione-calcium), pyrimidinyl carbinols (such as flurprimidol, and ancymidol), quarternary ammoniums (such as chlormequat-chloride, and mepiquat-chloride), and sulphonyl-amino phenyl-acetamides (such as mefluidide).

Plant growth regulators operate by various modes of action. For example, onium-type plant growth retardants such as chlormequat-chloride and mepiquat-chloride, that possess a positively charged ammonium, phosphonium or sulphonium group, function by blocking the synthesis of gibberellin early in the biosynthetic pathway. Growth retardants comprising a nitrogen-containing heterocycle, such as flurprimidol, paclobutrazol and uniconazole-P, act as inhibitors of monooxygenases that catalyse oxidative steps in gibberellin biosynthesis. Structural mimics of 2-oxoglutaric acid, such as the acylcyclohexanediones trinexapac-ethyl and prohexadione-calcium, interfere with the late steps of gibberellin biosynthesis. Other plant growth regulators, such as mefluidide, inhibit cell division and differentiation.

High quality, healthy turf is essential, for example, to the golfing industry. Accordingly, there is a continued need for maintaining such high quality turf even in the incidence of drought or other threatening conditions.

SUMMARY

By way of summary, the present invention includes methods of suppressing or controlling abiotic stress on warm-season turfgrass which comprises applying to the turfgrass, the locus thereof or the seeds thereof, a turf quality enhancing amount of a composition comprising acibenzolar-s-methyl and, optionally, trinexapac-ethyl.

The methods of the present invention are suitable for suppression or controlling abiotic stress and further improving the quality of the turfgrass to which it is applied. Accordingly, the methods of the present invention are useful both to (1) manage abiotic stress by suppressing or controlling the abiotic stress and (2) enhance the quality of the turfgrass to which it is applied. The method of the invention enhances the ability of end-users such as lawn care operators, golf course technicians and the like to manage, suppress or control turfgrass abiotic stress issues without undue phytotoxicity.

The above summary is intended to summarize certain embodiments of the present disclosure. Systems, methods and compositions will be set forth in more detail, along with examples demonstrating efficacy, in the figures and detailed description below. It will be apparent, however, that the detailed description is not intended to limit the present invention, the scope of which should be properly determined by the appended claims.

DETAILED DESCRIPTION

Figure 1:
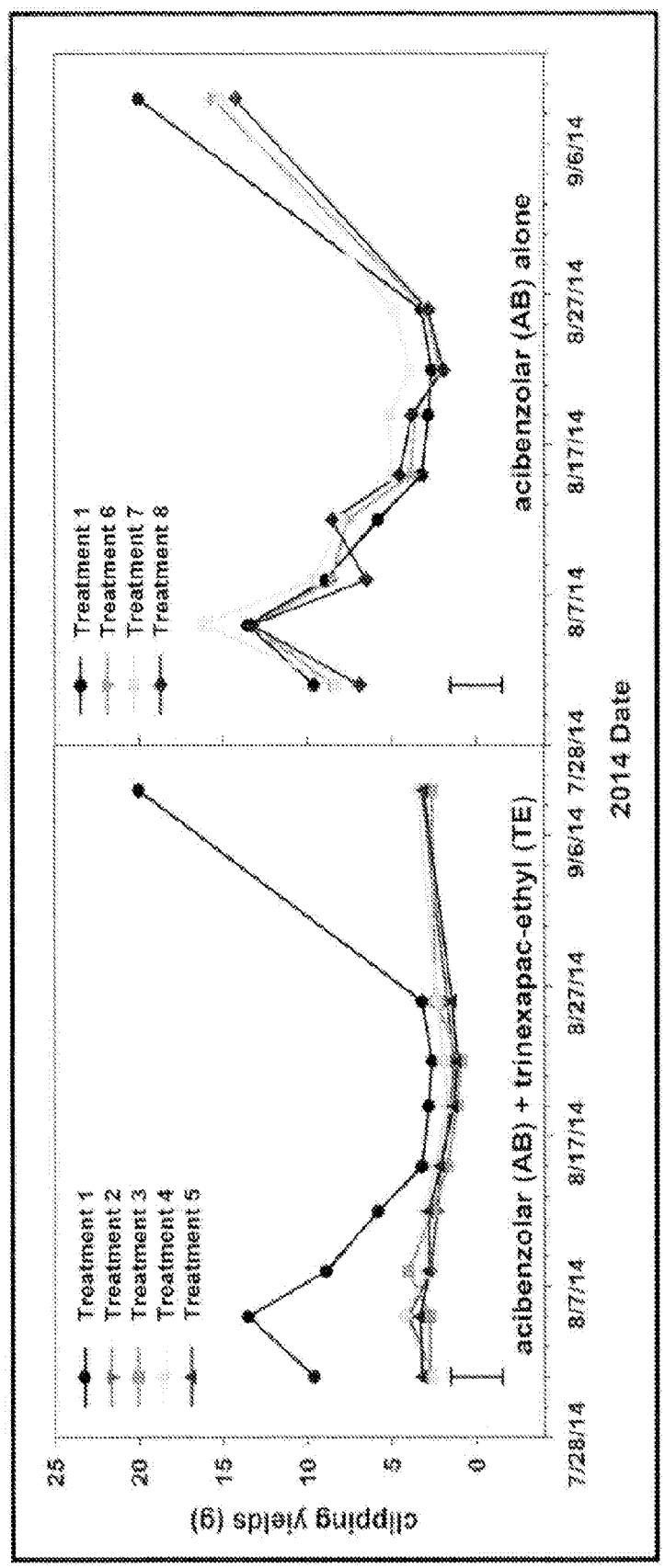
FIG. 1 is a graphical representation of the results provided from Example 1 relating to clipping yield.

As indicated above, the present invention includes methods of suppressing or controlling abiotic stress on warm-season turfgrass which comprises applying to the turfgrass, the locus thereof or the seeds thereof, a turf quality enhancing amount of a composition comprising acibenzolar-s-methyl (hereafter "ASM") and, optionally, trinexapac-ethyl (hereafter "TXP").

According to the invention, by "turfgrass" there is understood an annual or perennial Gramineae. Said gramineae preferably belongs to one or more of the genera *Agropyron, Agrostis, Axonopus, Bromus, Buchloe, Cynodon, Eremochloa, Festuca, Lolium, Paspulum, Pennisetum, Phleum, Poa, Stenotaphrum* or *Zoysia*. In some embodiments, said gramineae belongs to one or more of the genera *Agrostis, Buchloe, Cynodon, Eremochloa, Festuca, Lolium, Paspulum, Pennisetum, Poa, Stenotaphrum* or *Zoysia*.

The methods of the present invention may be useful, in some embodiments, on warm season turfgrasses. Some warm season turfgrasses that may be useful include, but are not limited to, Bermudagrasses (*Cynodon* L. C. Rich), Zoysiagrasses (*Zoysia* Willd.), St. Augustinegrass (*Stenotaphrum secundatum* (Walt.) Kuntze), Centipedegrass (*Eremochloa ophiuroides* (Munro.) Hack.), Carpetgrass (*Axonopus* Beauv.), Bahiagrass (*Paspalum notatum* Flugge.), Kikuyugrass (*Pennisetum clandestinum* Hochst. ex Chiov.), Buffalograss (*Buchloe dactyloides* (Nutt.) Engelm.) and Seashore paspalum (*Paspalum vaginatum* swartz).

According to the invention, the "locus" of a turf can relate to soil or to a substrate. An example for such a locus is a golf course, on which turfgrass is managed. According to the present invention the term "soil" means natural soil, which is typically present on a land area, such as soil being present on a golf course, or means soil, that has been modified, such as soil being granulated and/or treated with agrochemicals, such as for example fertilizers. An example of granulated and/or treated soil is disclosed in U.S. Pat. No. 5,265,372.

According to the invention, the term "substrate" means a medium for the growth of turfgrass and the like, suited for application to a variety of existing ground structures. Typically, such mediums are soil-free mixtures that include sufficient proportions of ingredients of elastomeric granules, suitable binding emulsion, mineral aggregate, filler and controlled release plant nutrient particles, so that when laid and cured, said mixture produces a water permeable, resilient substrate having air pockets through which a root system of turfgrass can penetrate. Turfgrass growing on said substrate can form a turf, which can be applied to non-porous surfaces, such as for example roofs of buildings, terraces and other hard surface areas, or to porous surfaces, such as for example football fields or golf courses. Examples of such substrates are described in WO 2005/002323. Elastomeric granules can be, for example, granules of rubber, granules of recycled vehicle tyre rubber or mixtures thereof.

The methods of the present invention may be applicable to any type of abiotic stress that turfgrass may experience during its growth. For example, in some embodiments, the methods of the present invention are applicable when the abiotic stress experienced by a plant during its growth is one or more of drought, flood, excessive temperature, low temperature, frost, excess sunlight, insufficient sunlight, wind, inadequate soil nutrients, excessive soil salinity, air pollution, soil pollution or water pollution. In additional embodiments, the methods of the present invention are applicable when the abiotic stress experienced are one or more of drought, excessive temperature or salinity.

As further indicated above, the present methods may also be utilized to improve the quality of the turfgrass to which it is applied. As used herein the phrase "quality" of turfgrass is meant to include visual quality of turfgrass and functional quality of turfgrass.

"Visual quality" of turfgrass relates to the visual appearance, such as density (the number of aerial shoots per unit area), uniformity (for example uniformity of texture, e.g. width of the leaf blades, which can be fine-textured as for example in red fescue or coarse-textured as for example in tall fescue), colour or smoothness (which affects for example the playability of a golf course).

"Functional quality" of turfgrass relates to, for example, rigidity (resistance of the turfgrass leaves to compression and is related to the wear resistance of a turf), elasticity (tendency of the turfgrass leaves to spring back once a compressing force is removed), resiliency (capacity of a turf to absorb a shock without altering its surface characteristics), ball roll (average distance a ball travels upon being released to a turf surface), yield (measure of clippings removed with mowing), verdure (measure of amount of aerial shoots remaining after mowing), rooting (amount of root growth evident at any one time during the growing season) and recuperative capacity (capacity of turfgrasses to recover from damage caused by disease organism, insects, traffic and the like).

An improvement in the quality of turfgrass provided by the present methods may relate to one of the mentioned visual or functional quality characteristics or to any combination of these quality characteristics. According to the present invention, an "improvement" is a measurable or noticeable increase in a given turfgrass quality characteristic over the same turfgrass quality characteristic produced under the same conditions, but without the application of the subject method. An improvement in the quality characteristics of turfgrass is, for example, a greener or more pleasant, leaf colour of the turf.

As indicated above, the methods of the present invention may be useful in suppressing abiotic stress or stresses in warm-season turfgrasses. In some embodiments of the present invention, ASM may be applied at a rate of between about 4 and about 200 g/ha per application. In further embodiments of the invention, ASM may be applied at a rate between about 12 and about 150 g/ha per application, or between 12 and about 96 g/ha per application, or between about 12 and about 64 g/ha per application, or between about 12 and about 32 g/ha per application, or between about 32 and about 140 g/ha per application, or between about 32 and about 96 g/ha per application, or between about 32 and about 64 g/ha per application, or between about 64 and about 140 g/ha per application, or between about 64 and about 96 g/ha per application, or between about 96 and about 140 g/ha per application. Utilizing such rates per application on warm-season turfgrasses, the Inventors have found that abiotic stresses of the warm-season turfgrasses may be lessened while also avoiding unacceptable phytotoxicity to the grasses. In contrast, utilizing such rates on cool-season grasses has been found to provide unacceptable levels of phytotoxicity, which leads to grasses that do not reach the standards of appropriate visual and playable quality by golf superintendents.

If TXP is utilized in the methods of the present invention, it may be applied at a rate of between about 15 and about 1000 g/ha per application, or at a rate between about 24 and about 140 g/ha per application, or between about 64 and about 140 g/ha per application, or between about 96 and about 140 g/ha per application. The user's specifications, including type of warm-season turfgrass may influence the type of rate utilized.

In addition, the rates utilized of the ASM and other, optionally-applied active components may vary based on the type of grass or use of grass to which they are being applied. For example, on a golf course, fairways and greens are typically sprayed with different rates of active ingredients. Accordingly, compositions utilized in the methods of the present invention may be applied in any of the rates expressed above for ASM or TXP.

If ASM is to be applied with TXP or another active ingredient, as discussed further below, the ratios of ASM to the other active ingredient may be between about 2000:1 to about 1:2000. In other embodiments, the ratios of ASM to other active ingredients may be between about 1000:1 and about 1:1000, or between about 500:1 and about 1:500, or between about 100:1 and about 1:100. In addition, in further embodiments of the invention, the ratio between ASM and an additional active ingredient may be between 5:1 and about 1:5, or between about 2:1 to about 1:2, or 1:1.

The amount of ASM and, optionally, TXP or other active ingredient to be applied and the number of re-treatments in the practice of a method according to the invention will depend on various factors, such as the subject of the treatment, such as, plants, turfgrass locus or seeds; the type of treatment, such as, for example spraying, spreading or seed dressing; the purpose of the treatment, such as, for example suppression or control abiotic stress; the type of abiotic stress to be controlled; enhancing turf quality, the application time; environmental conditions, the number of re-treatment intervals desired or the turfgrass species.

According to the present invention the term "applied" means either simultaneously or sequentially. Accordingly, if ASM is applied with a second active ingredient, including TXP, the actives may be applied either simultaneously or sequentially. If administered sequentially, the components may be administered in any order in a suitable timescale, for example, with no longer than 24 hours between the time of administering the first component and the time of administering the last component. Suitably, all the components may be administered within a timescale of a few hours, such as one hour. If the components are administered simultaneously, they may be administered separately or as a tank mix or as a pre-formulated mixture of all the components or as a pre-formulated mixture of some of the components tank mixed with the remaining components.

ASM and, optionally, trinexapac-ethyl containing compositions used in the method of the invention can be prepared on site by the end-user shortly before application to the turfgrass, the locus thereof or seeds thereof by mixing in aqueous solution an ASM containing composition and a separate active ingredient containing composition, one or more optional additional active ingredient containing composition(s) and, optionally, one or more suitable surfactant(s) or adjuvant(s). Such compositions are typically referred to as "tank-mix" compositions.

Alternatively, the compositions used in the method of the invention may be provided to the end-user already formulated, either at the desired dilution for application ("ready to use" compositions) or requiring dilution, dispersion, or dissolution in water by the end-user ("concentrate" compositions). In some embodiments, the preformulated concentrates may be liquids or particulate solids. In another aspect of the methods of the invention, ASM can be applied to the turfgrass or the locus thereof using turfgrass seed as a carrier.

The compositions used in the methods according to the invention may comprise one or more additional active ingredients, such as a fungicide, insecticide, herbicide or additional growth regulator. An example would be a composition that comprises a fungicide. Any suitable fungicide or herbicide may be used in the composition, for example to provide control of pests, to overcome problems and delay the onset of resistance, or to provide improved efficacy though an additive or synergistic effect of the active ingredients. Turf wetting agents may also be used in conjunction with the method of the invention. Suitable examples include Revolution® or Radiance® (Aquatrols); and Qualibra™ (Syngenta).

As indicated above, the methods of the invention for suppressing or controlling abiotic stress on turfgrass with ASM and, optionally, TXP contemplate one or more additional active ingredients being applied including, but not limited to, azoxystrobin; additional plant growth regulators such as uniconazole, and paclobutrazol; neonicotinoids such as thiamethoxam and imidacloprid; bisamides such as cyantraniliprole and chlorantraniliprole; fluazinam; propiconazole, difenoconazole, cypraconazole; fludioxonil; mefenoxam; cyprodinil; thiophanate methyl; iprodione; triadimefon; propamocarb; fosetyl-al; flurprimidol; flutalonil; pyraclostrobin; boscalid; vinclozolin; trifloxystrobin; myclobutanil; fenarimol; SDHI fungicides such as penthiopyrad, isopyrazam, fluxapyroxad, fluopyram and solatenol; fluoxastrobin; phophonic acid derivatives such as phosphonic acid, monopotassium salt; abamectin; cis-jasmone; abamectin iron chelate mixtures; and lambda cyhalothrin.

In additional embodiments, the methods of the invention contemplate an abiotic stress reducing effective amount of a composition comprising ASM and, optionally, TXP as noted above with fungicides having protectant modes of fungicidal action being applied to the turfgrass or to the locus of the turfgrass. Suitable fungicides with protectant modes of action include, for example, fluazinam and mancozeb.

The compositions used in the methods of the invention may be employed in any conventional form, for example in the form of a twin pack, a powder for dry seed treatment (DS), an emulsion for seed treatment (ES), a flowable concentrate for seed treatment (FS), a solution for seed treatment (LS), a water dispersible powder for seed treatment (WS), a capsule suspension for seed treatment (CF), a gel for seed treatment (GF), an emulsion concentrate (EC), a suspension concentrate (SC), a suspo-emulsion (SE), a capsule suspension (CS), a water dispersible granule (WG), an emulsifiable granule (EG), an emulsion, water in oil (EO), an emulsion, oil in water (EW), a micro-emulsion (ME), an oil dispersion (OD), an oil miscible flowable (OF), an oil miscible liquid (OL), a soluble concentrate (SL), an ultra-low volume suspension (SU), an ultra-low volume liquid (UL), a technical concentrate (TK), a dispersible concentrate (DC), a wettable powder (WP) or any technically feasible formulation in combination with agriculturally acceptable adjuvants.

Said compositions used according to the methods of invention may be produced in conventional manner, e.g. by mixing the ASM with at least one appropriate formulation adjuvant.

The term "formulation adjuvant" according to the invention denotes a natural or synthetic, organic or inorganic material with which the compound of formula I is combined in order to facilitate its application to turf. This adjuvant is hence generally inert, and it must be agriculturally acceptable, in particular to turf.

The formulation adjuvant can be a carrier or a surfactant. In compositions according to the invention more than one adjuvant can be present, in such embodiments more than one carrier and/or more than one surfactant can be present, a non-limiting example would be one carrier and two surfactants.

The "carrier" can be a liquid carrier (water, alcohols, ketones, petroleum fractions, aromatic or paraffinic hydrocarbons, chlorinated hydrocarbons, liquefied gases, and the like) or a solid carrier.

Suitable liquid carriers are, but are not restricted to: aromatic hydrocarbons, in particular the fractions $C_8$ to $C_{12}$, such as xylene mixtures or substituted naphthalenes, phthalic esters such as dibutyl or dioctyl phthalate, dipropylene glycol dibenzoate, aliphatic hydrocarbons such as cyclohexane or paraffins, alcohols and glycols as well as their ethers, esters and diesters, such as ethylene glycol monomethyl ether, ketones such as cyclohexanone, strongly polar solvents such as, but not restricted to, N-methyl-2-pyrrolidone, dimethyl sulfoxide or dimethylformamide, and, if appropriate, epoxidized vegetable oils or soybean oil; or water.

Suitable solid carriers are, but are not restricted to: aluminium silicate, urea, sodium sulphate, talc, calcium sulphate or potassium sulphate and seed.

According to the invention a single carrier or a mixture of two or more carriers may be present in the composition(s) used in the methods according to the invention.

"Surfactants" are non-ionic, cationic, amphoteric and/or anionic surfactants having good emulsifying, dispersing and wetting properties. According to the invention a single surfactant or a mixture of two or more surfactants may be present. The surfactants customarily employed in formulation technology are described, inter alia, in the following publications: "McCutcheon's Detergents and Emulsifiers Annual", MC Publishing Corp., Glen Rock, N.J., 1988 and M. and J. Ash, "Encyclopedia of Surfactants", Vol. I-III, Chemical Publishing Co., New York, 1980-1981.

Among the surfactants there may be mentioned, e.g., polyacrylic acid salts, lignosulphonic acid salts, phenolsulphonic or (mono- or di-alkyl)naphthalenesulphonic acid salts, laurylsulfate salts, polycondensates of ethylene oxide with lignosulphonic acid salts, polycondensates of ethylene oxide with fatty alcohols or with fatty acids or with fatty amines, substituted phenols (in particular alkylphenols or arylphenols such as mono- and di-(polyoxyalkylene alkylphenol) phosphates, polyoxyalkylene alkylphenol carboxylates or polyoxyalkylene alkylphenol sulfates), salts of sulphosuccinic acid esters, taurine derivatives (in particular alkyltaurides), polycondensates of ethylene oxide with phosphated tristyrylphenols and polycondensates of ethylene oxide with phosphoric esters of alcohols or phenols.

A seed dressing formulation is applied in a manner known per se to the seeds employing the compositions according to the invention and a diluent in suitable seed dressing formulation form, e.g. as an aqueous suspension or in a dry powder form having good adherence to the seeds. Such seed dressing formulations are known in the art. Seed dressing formulations may contain the active ingredients in encapsulated form, e.g. as controlled release capsules or microcapsules.

The compositions used in the methods according to the invention may comprise one or more formulation additives, such as, but not limited to, biocides, anti-freeze, stickers, thickeners and compounds that provide adjuvancy effects including, for example, one or more phthalocyanines or copper phthalocyanines including pigment green such as pigment green 7; phthalocyanine green g; or pigment green 42.

In general, when phthalocyanines or copper phthalocyanines are present in compositions used in the methods according to the invention, the rate of application to the turfgrass or to the locus of the turfgrass is from 0.001 to 10 kilograms of phthalocyanine per hectare (kg/ha), suitably from about 0.01 to about 2 kg/ha, more suitably from about 0.1 to about 1 kg/ha, most suitably from about 0.2 to about 0.8 kg/ha.

In general, the compositions according to the invention include from 0.01 to 90% by weight of a compound of ASM, from 0.01 to 90% by weight of a compound of TXP or other active ingredient, and from 0 to 20% surfactant and from 10 to 99.99% carrier.

Application to Turfgrass:

The methods according to the invention can be practiced by treating the turfgrass with an effective amount of ASM and, optionally, TXP according to the invention. Within said embodiment of the invention, the ASM and, optionally, TXP is suitably applied to the turfgrass by spraying or spreading. Treatment of turfgrass in accordance with the methods of the invention may be performed by lawn care operators or golf course technicians using known techniques.

In one embodiment of the inventive methods, to maintain high quality, healthy turfgrass on the intended surface area of ground, such as for example, a golf course, a sports field, a park area or a home lawn, and to protect said turfgrass against abiotic stress, ASM and, optionally, TXP are applied to the turfgrass once or more than once during maintenance of the turfgrass.

In some embodiments of the present inventions, the method of suppressing or controlling abiotic stress comprises a treatment regime, where ASM and, optionally, TXP are applied between about 2 and about 8 times, or between about 3 and 4 times, to the turfgrass or to the locus thereof at intervals of from 5 to 25 days, up to the cumulative maximum labeled rate for ASM and, optionally, TXP per turf growing season for the specific turfgrass locus being treated according to existing restrictions.

In a more specific embodiment, in the practice of the methods of the invention, ASM and, optionally, TXP are applied between about 1 and 20 times, or between about 2 and 18 times, or between about 3 and 15 times, or between about 4 and 12 times, or between about 2 and about 8 times, or between about 3 and 4 times to the turfgrass or the locus thereof at intervals of from 7 to 21 days; or from 7 to 14 days, or from 14 to 21 days up to the cumulative maximum labeled rate for ASM and, optionally, TXP for the turfgrass locus being treated.

In another aspect, suppression or control of abiotic stress is achieved by re-applying a turf quality enhancing amount of the combination of ASM and, optionally, TXP, suitably at the foregoing rates and weight ratios, at intervals of from 5 to 21 days, suitably from 7 to 14 days, during the turf growing season.

In a particular embodiment, 2 to 8 applications of ASM and, optionally, TXP are applied at 21 day intervals, pre-disease or under low to moderate disease pressure during the turf growing season.

In another embodiment, 10 to 15 applications of ASM and, optionally TXP, are applied at 14 day intervals, pre-disease.

Application to the Locus of the Turfgrass:

The compositions used in the method according to the invention can be applied to the turfgrass by treating the locus of the turfgrass with a composition comprising ASM and, optionally, TXP according to the invention.

Application of ASM and, optionally, TXP compositions used in the method of the invention to a locus covers liquid (sprayable) or granular (active ingredient (a.i.) on inert and a.i. on fertilizer) (spreadable) applications as well.

For example, in the practice of method of the invention compositions comprising ASM and, optionally, TXP can be applied to the soil before or after the seeds of the turfgrass are sown or placed into the soil; or such compositions are applied according to the method of invention to a substrate for the growth of turfgrass before or after the seeds of the turfgrass are placed into the substrate; or the compositions applied according to the method of the invention can be applied to the soil before turfgrass grown on a substrate are placed on top of the soil together with the substrate.

In one embodiment, according to the method of the invention compositions comprising ASM and, optionally, TXP are applied to the turfgrass as a sprayable liquid formulation. In another embodiment, such compositions are applied to the turfgrass as a granular formulation. Suitable granules include inert and fertilizer granules. The active ingredient may be dispersed throughout, impregnated into, or coated on the surface of the granules.

Application to the Seeds of the Turfgrass:

The method according to the invention also can be practiced by applying the compositions containing ASM and, optionally, TXP to the seeds of the turfgrass by treating the seeds with such a composition. When the method according to the invention involves using ASM and, optionally, TXP compositions for treating seed, rates of 0.001 to 50 g of the compound mixture per kg of seed, suitably from 0.01 to 10 g per kg of seed, are generally sufficient. In one embodiment, an amount of seed used as a carrier for ASM and, optionally, TXP can be applied to the soil or substrate to deliver a suitable amount of the active ingredient.

BIOLOGICAL EXAMPLES

The following Examples and the results provided in the Figures illustrate the effectiveness of the present invention Example 1

Four applications of treatments were made on 21 day intervals through the season on Tifsport hybrid bermudagrass maintained at 1.27 cm. Four replications of each treatment were completed. The treatments included: (1) an untreated check; (2) TXP applied at a rate of 96 g/ha; (3) TXP applied at a rate of 96 g/ha and ASM applied at a rate of 32 g/ha; (4) TXP applied at a rate of 96 g/ha and ASM applied at a rate of 64 g/ha; (5) TXP applied at a rate of 96 g/ha and ASM applied at a rate of 96 g/ha; (6) ASM applied alone at a rate of 32 g/ha; (7) ASM applied alone at a rate of 64 g/ha; and (8) ASM applied alone at a rate of 96 g/ha. The plots were exposed to a dry down cycle by withholding irrigation three days after the second TXP treatment, where irrigation was withheld for up to 40 days and resumed to avoid turf loss. Clippings were collected two times per week and turf quality was visually rated weekly during the drought cycle. Soil volumetric water content was measured every two days during the dry-down cycle using a Spectrum Field Scout TDR probe.

Figure 2:
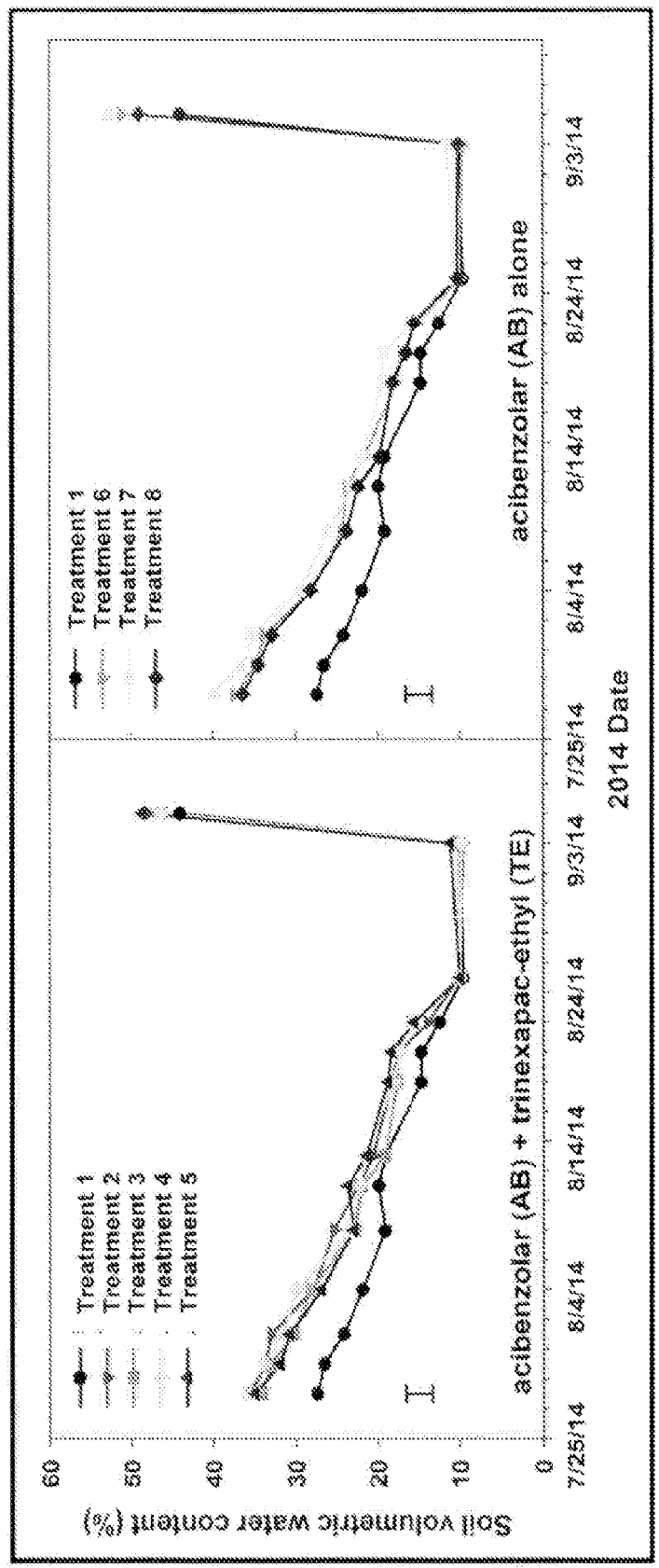
FIG. 2 is a graphical representation of the results provided from Example 1 relating to soil volumetric water content.
Figure 3:
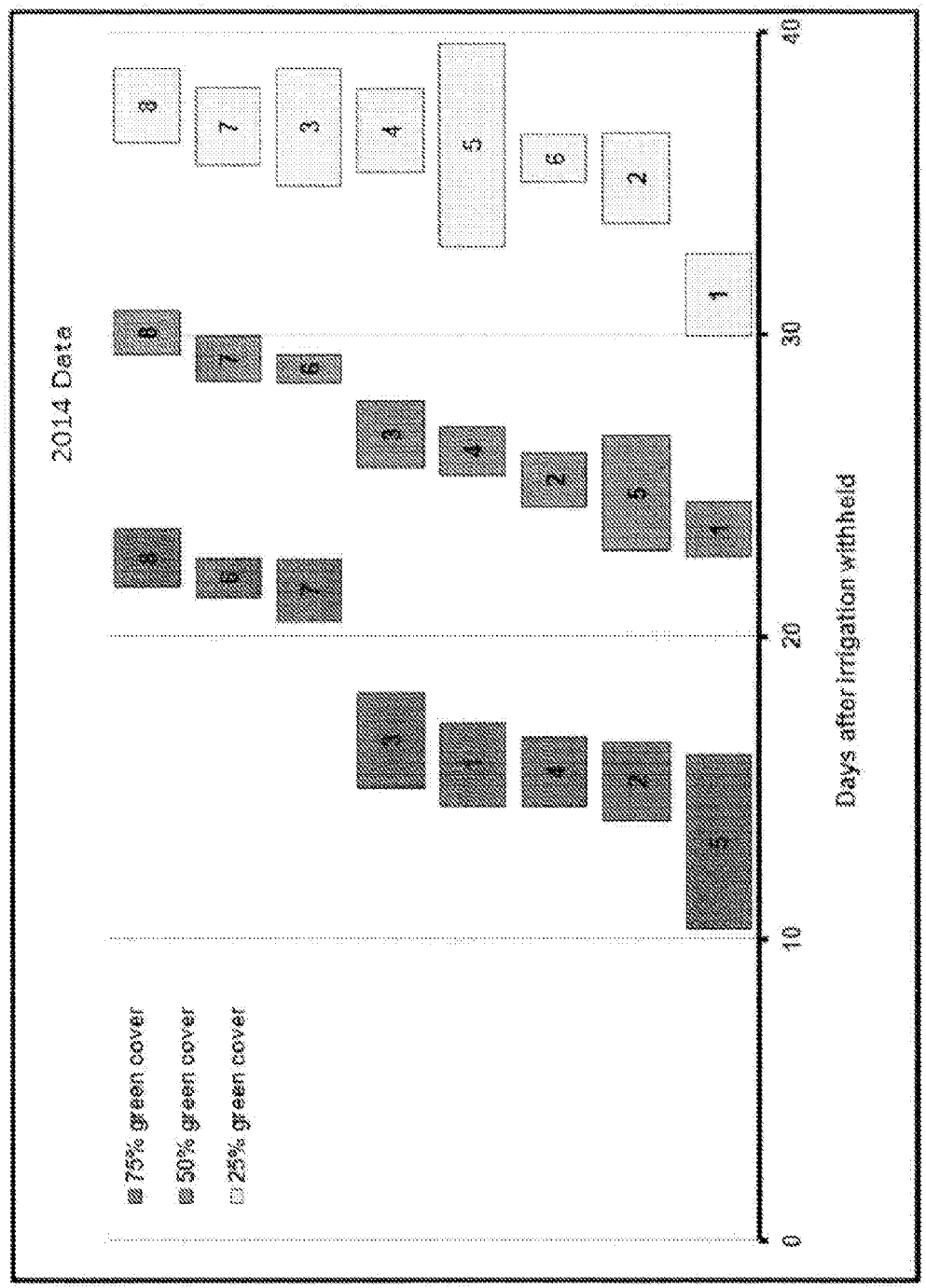
FIG. 3 is a graphical representation of the results provided from Example 1 relating to green cover.

The results of the testing, including clipping yields (FIG. 1), soil volumetric water content (FIG. 2), and greening rating (FIG. 3) are shown in the Figures.

Example 2

Three applications of treatments were made on 21 day intervals through the season (June 21, July 11, and August 4) on Tifsport hybrid bermudagrass maintained at 0.500 inches. The treatments included: (1) an untreated check; (2) TXP applied at a rate of 96 g/ha; (3) TXP applied at a rate of 96 g/ha and ASM applied at a rate of 32 g/ha; (4) TXP applied at a rate of 96 g/ha and ASM applied at a rate of 64 g/ha; (5) TXP applied at a rate of 96 g/ha and ASM applied at a rate of 96 g/ha; (6) ASM applied alone at a rate of 32 g/ha; (7) ASM applied alone at a rate of 64 g/ha; and (8) ASM applied alone at a rate of 96 g/ha. The plots were exposed to a dry down cycle by withholding irrigation following applications 2 and 3. Clipping collections were performed just prior to the $2^{nd}$ application and continued twice per week through the completion of the trial.

Figure 4:
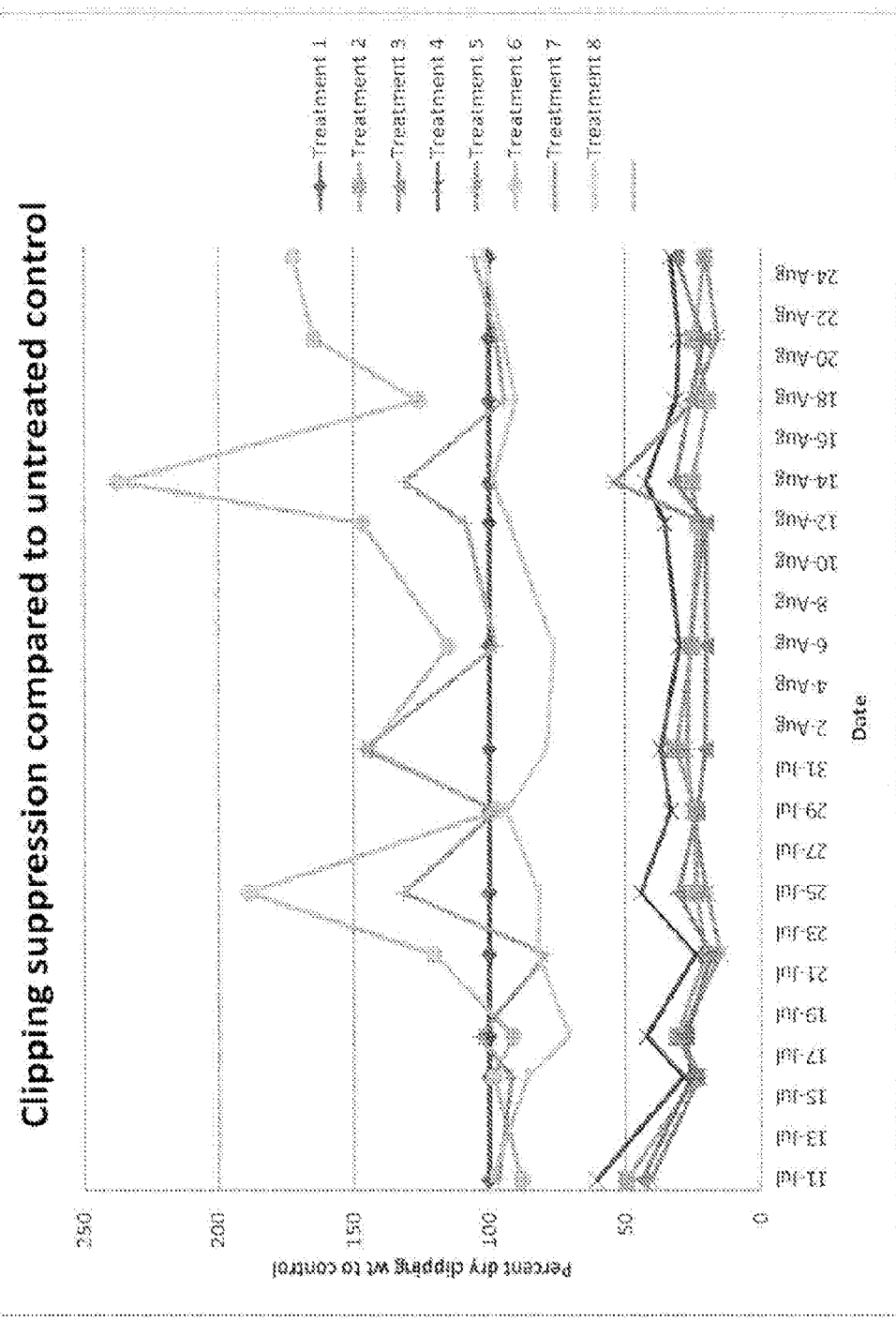
FIG. 4 is a graphical representation of the results provided from Example 2 relating to clipping yield.
Figure 5:
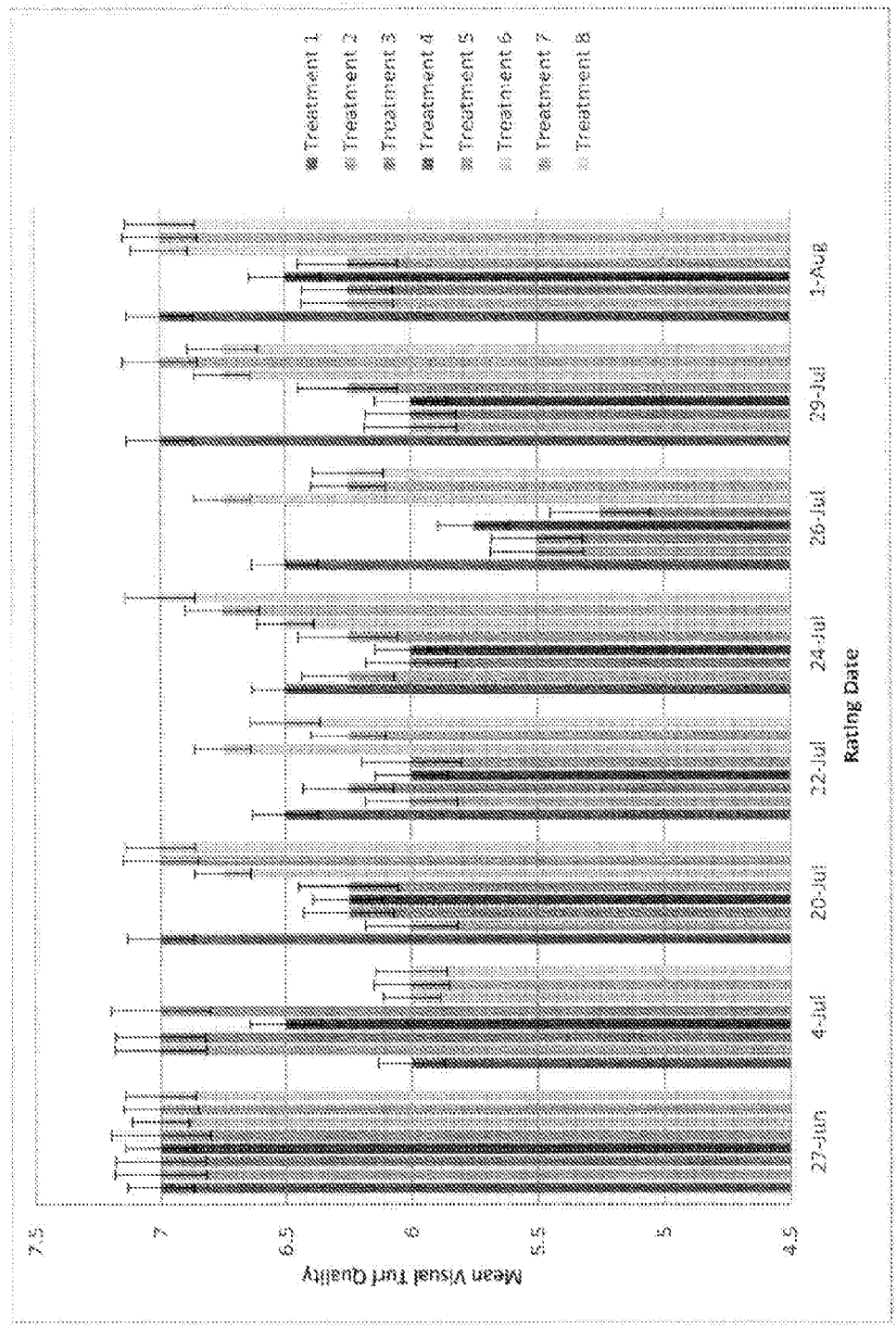
FIG. 5 is a graphical representation of the results provided from Example 2 relating to mean visual turf quality.
Figure 6:
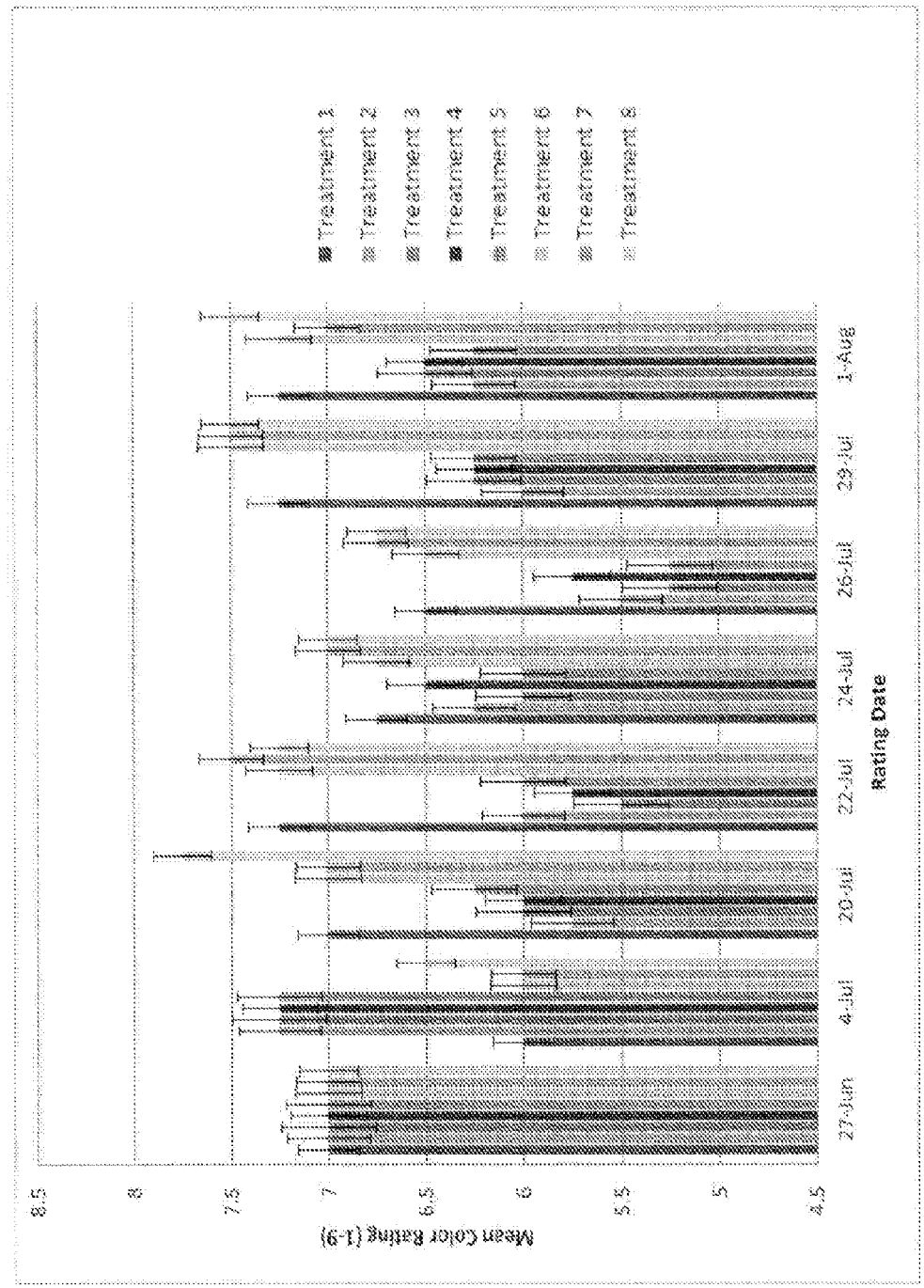
FIG. 6 is a graphical representation of the results provided from Example 2 relating to mean color rating.
Figure 7:
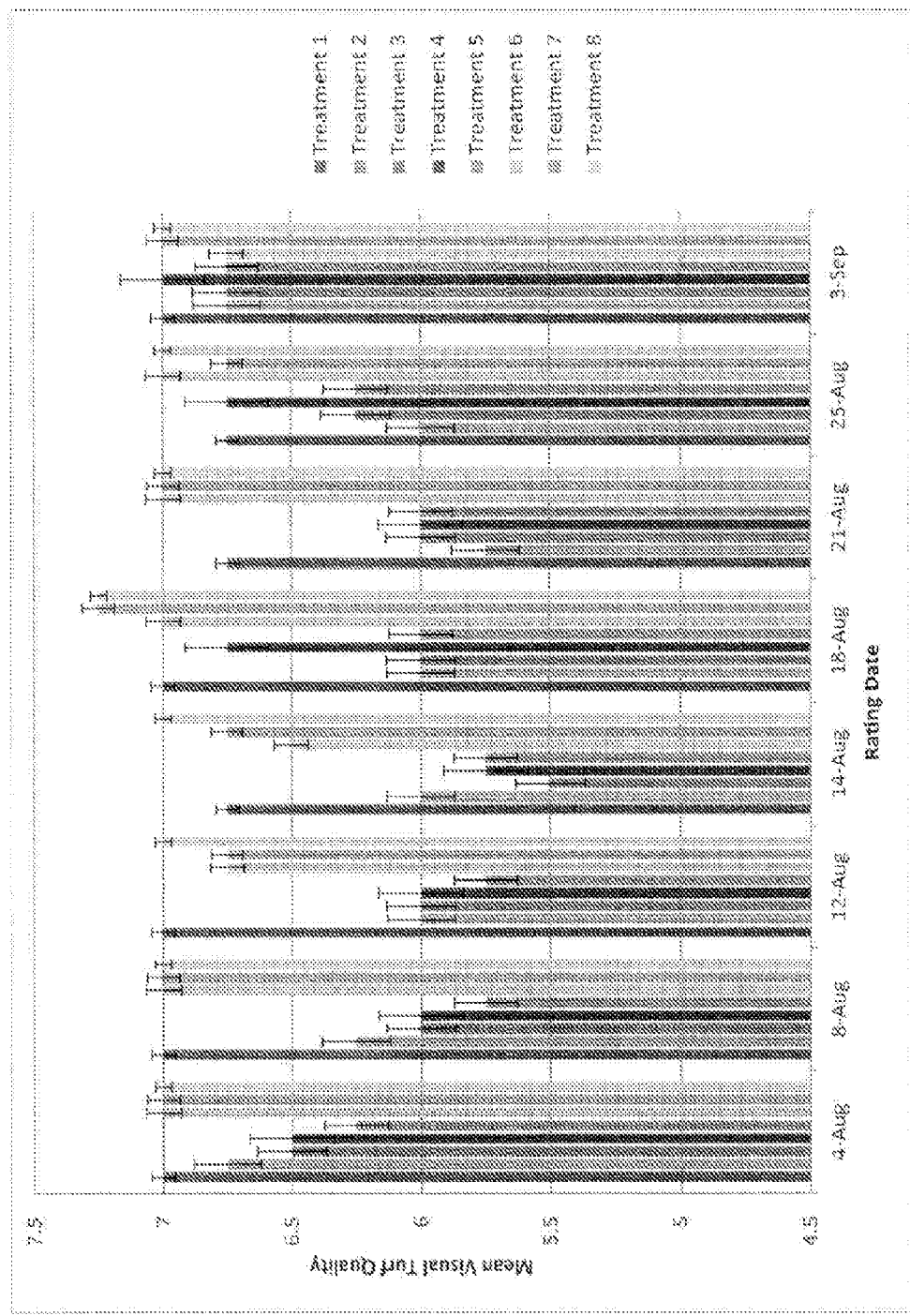
FIG. 7 is a graphical representation of the results provided from Example 2 relating to mean visual turf quality.
Figure 8:
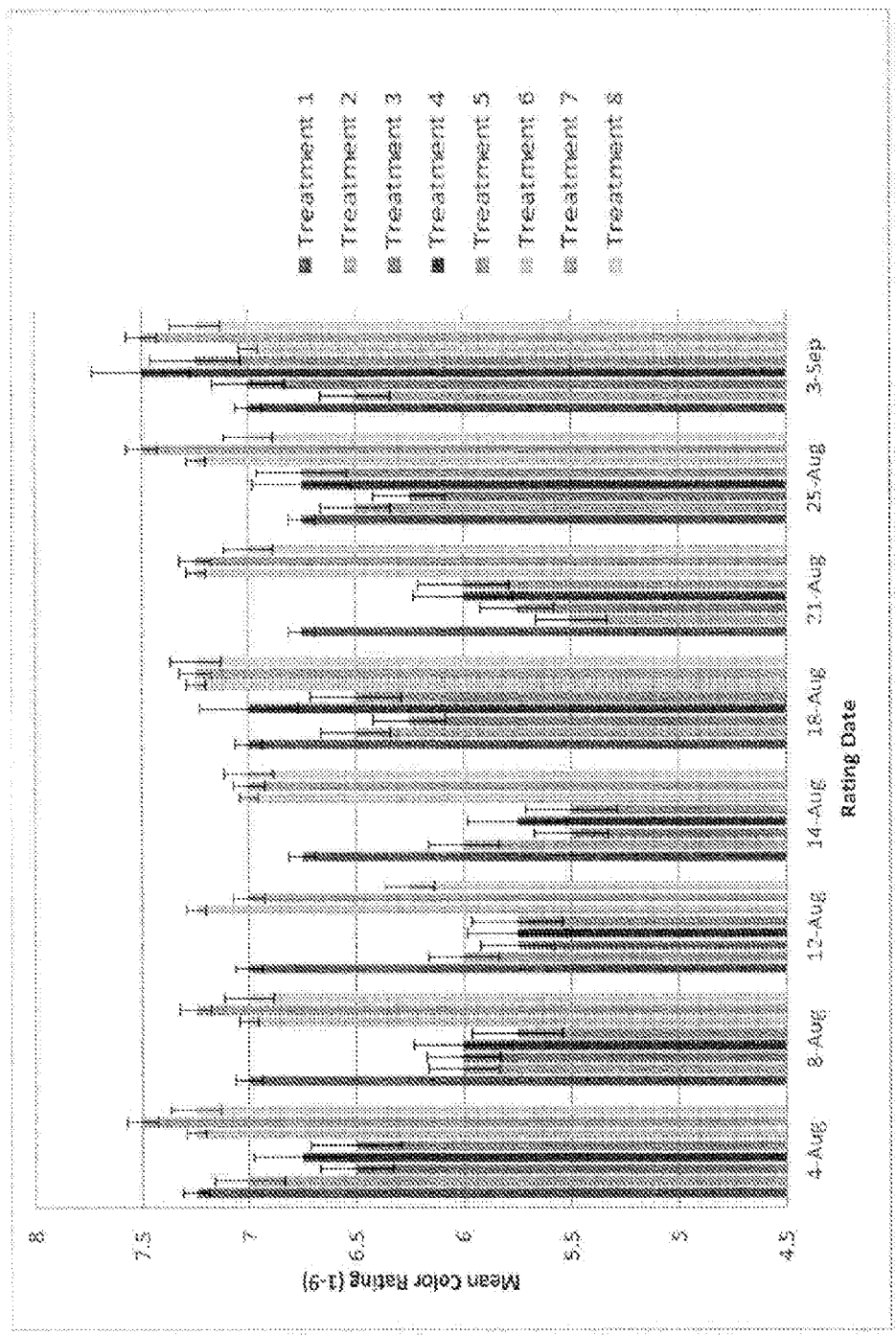
FIG. 8 is a graphical representation of the results provided from Example 2 relating to mean color rating.
Figure 10:
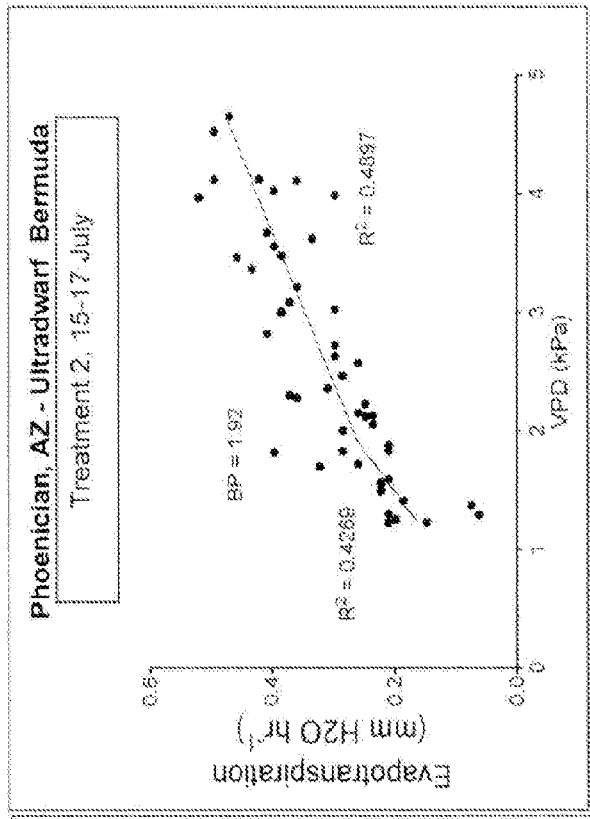
FIG. 10 is a graphical representation of the results provided from Example 3 relating to evapotranspiration vs. vapor pressure deficit.
Figure 9:
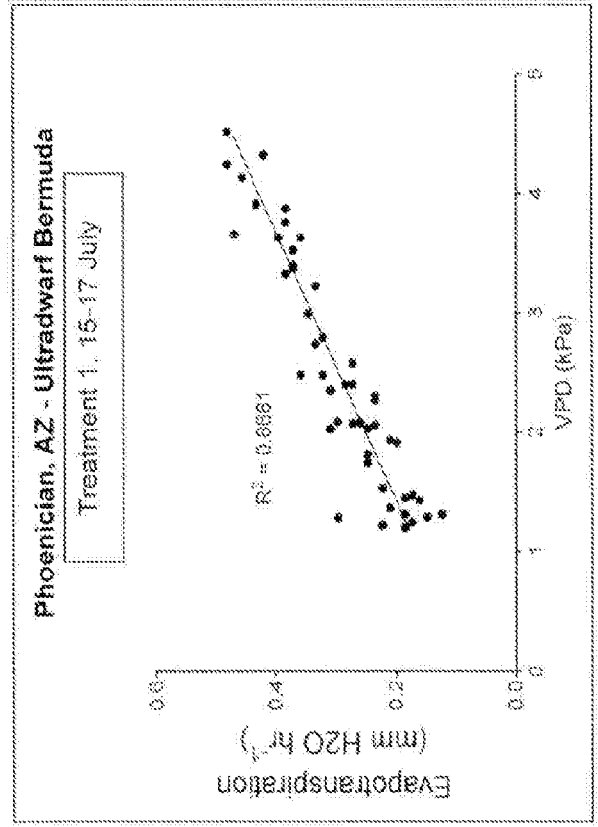
FIG. 9 is a graphical representation of the results provided from Example 3 relating to evapotranspiration vs. vapor pressure deficit.
Figure 11:
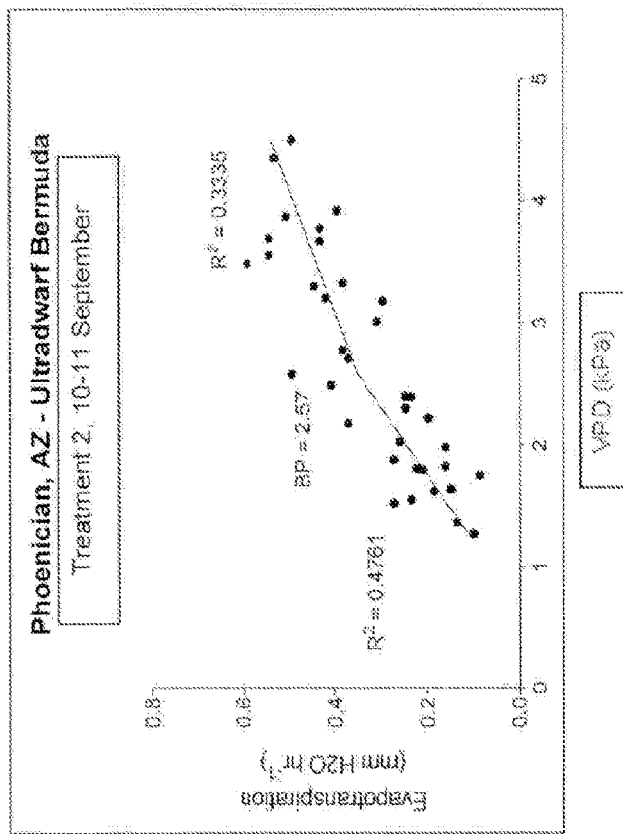
FIG. 11 is a graphical representation of the results provided from Example 3 relating to evapotranspiration vs. vapor pressure deficit.
Figure 12:
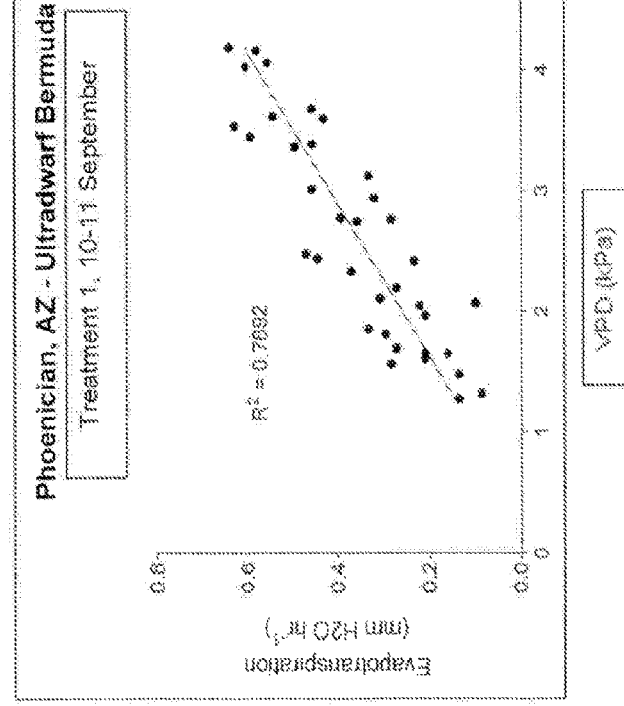
FIG. 12 is a graphical representation of the results provided from Example 3 relating to evapotranspiration vs. vapor pressure deficit.

The results of the testing, including clipping yields (FIG. 4), mean visual turf quality (FIGS. 5 and 7), and mean color rating (FIGS. 6 and 8) are shown in the Figures.

Example 3

Fifteen applications of treatments were made on 14 day intervals through the season (starting in May and extending through October) on Ultradwarf Bermudagrass on golf course greens. The treatments included (1) a Control that included products with the active ingredients of chlorothalonil, fluazinam and azoxystrobin and no ASM and (2) a treatment that included products with the same active ingredients and rates of the Control treatment, but also included 30.8 g/ha rate of ASM for each spray.

Turfgrass Samples from the treated plots were taken from a) the ASM treated plots as well b) the Control plots without acibenzolar-s-methyl at two different timings—July 2015 and September 2015. All samples were tested for evapotranspiration at various vapor pressure deficits (VPD) in the growth chamber. The results of the testing are illustrated in FIGS. 9-12. The results indicate that as VPD increases, those plots without ASM form a natural linear regression. However the ASM treated turfgrass is able to decrease its rate of transpiration causing an overall reduced evapotranspiration as VPD increases, forming a non-linear regression. ASM allows the turfgrass to hold on to more water as temperatures increase and results in improved turf quality even in the face of increased drought or heat stress. In addition, the rates of ASM did not result in any unacceptable phytotoxicity to the turfgrass.

Although the invention has been described with reference to preferred embodiments and examples thereof, the scope of the present invention is not limited only to those described embodiments. As will be apparent to persons skilled in the art, modifications and adaptations to the above-described invention can be made without departing from the spirit and scope of the invention, which is defined and circumscribed by the appended claims. All publications cited herein are hereby incorporated by reference in their entirety for all purposes to the same extent as if each individual publication were specifically and individually indicated to be so incorporated by reference.

The invention claimed is:

1. A method for controlling or suppressing abiotic stress in warm-season turfgrass, comprising applying to the turfgrass or to the locus of the turfgrass, a turf quality improving amount of acibenzolar-S-methyl at a rate between about 32 and 96 g/ha, wherein applying the acibenzolar-S-methyl is done through a granular application.

2. A method for controlling or suppressing abiotic stress in warm-season turfgrass, comprising applying to the turfgrass or to the locus of the turfgrass, a turf quality improving amount of acibenzolar-S-methyl at a rate between about 32 and 96 g/ha, wherein applying the acibenzolar-S-methyl is done using a seed as a carrier.

3. The method according to claim 1, wherein the only active ingredient is acibenzolar-S-methyl.

4. The method of claim 2, wherein the warm season turfgrass is Bermudagrass.

5. The method of claim 2, wherein the warm-season turfgrass is Zoysiagrass.

6. The method of claim 2, wherein acibenzolar-S-methyl is applied at the rate of from 32 to 64 g/ha.

7. The method of claim 2, wherein acibenzolar-S-methyl is applied between about two and 18 times, at intervals of from 5 to 21 days during the turf growing season.

8. The method of claim 2, wherein acibenzolar-S-methyl is applied between about three and four times, at intervals of from 14 to 21 days during the turf growing season.

9. The method according to claim 2, wherein the abiotic stress relates to drought conditions.

10. The method according to claim 2, wherein the method further comprising applying trinexapac-ethyl to said warm-season turfgrass.

11. The method according to claim 10, wherein trinexapac-ethyl is applied at a rate between about 64 and about 140 g/ha per application.

12. The method according to claim 2, wherein the method further comprising applying chlorothalonil.

13. The method according to claim 2, wherein the method further comprising applying fluazinam.

14. The method according to claim 2, wherein the method further comprising applying azoxystrobin.

15. The method according to claim 2, wherein the only active ingredient is acibenzolar-S-methyl.

16. The method according to claim 11, wherein the only active ingredients are acibenzolar-S-methyl and trinexapac-ethyl.

17. The method of claim 1, wherein the warm season turfgrass is Bermudagrass.

18. The method of claim 1, wherein the warm-season turfgrass is Zoysiagrass.

19. The method of claim 1, wherein acibenzolar-S-methyl is applied at the rate of from 32 to 64 g/ha.

20. The method of claim 1, wherein acibenzolar-S-methyl is applied between about two and 18 times, at intervals of from 5 to 21 days during the turf growing season.

21. The method of claim 1, wherein acibenzolar-S-methyl is applied between about three and four times, at intervals of from 14 to 21 days during the turf growing season.

22. The method according to claim 1, wherein the abiotic stress relates to drought conditions.

23. The method according to claim 1, wherein the method further comprising applying trinexapac-ethyl to said warm-season turfgrass.

24. The method according to claim 23, wherein trinexapac-ethyl is applied at a rate between about 64 and about 140 g/ha per application.

25. The method according to claim 1, wherein the method further comprising applying chlorothalonil.

26. The method according to claim 1, wherein the method further comprising applying fluazinam.

27. The method according to claim 1, wherein the method further comprising applying azoxystrobin.

28. The method according to claim 24, wherein the only active ingredients are acibenzolar-S-methyl and trinexapac-ethyl.

* * * * *